United States Patent [19]

Sekoguchi et al.

[11] Patent Number: 4,923,115
[45] Date of Patent: May 8, 1990

[54] MIXING VALVE APPARATUS

[75] Inventors: Kotohiko Sekoguchi, Ikeda; Keiichi Noguchi; Mutsushi Muramoto; Takayuki Ohata, all of Osaka, all of Japan

[73] Assignee: Miyawaki Incorporated, Osaka, Japan

[21] Appl. No.: 188,794
[22] PCT Filed: Jul. 17, 1987
[86] PCT No.: PCT/JP87/00526
 § 371 Date: Mar. 17, 1988
 § 102(e) Date: Mar. 17, 1988
[87] PCT Pub. No.: WO88/00666
 PCT Pub. Date: Jan. 28, 1988

[30] Foreign Application Priority Data

Jul. 17, 1986 [JP] Japan ................. 61-168260
Apr. 23, 1987 [JP] Japan ................. 62-101398
Apr. 23, 1987 [JP] Japan ................. 62-101399
Apr. 23, 1987 [JP] Japan ................. 62-101400

[51] Int. Cl.$^5$ ............................. G05D 23/13
[52] U.S. Cl. .................. 236/12.11; 137/88; 236/12.14
[58] Field of Search ........... 236/12.15, 12.14, 12.11, 236/80 R; 137/88

[56] References Cited

U.S. PATENT DOCUMENTS 113,455  4/1871  Scrannage et al. ............. 251/77 X
1,243,999 10/1917  Snediker ..................... 236/12.14
2,184,291 12/1939  Drapeau ...................... 236/80 RX
2,550,907  5/1951  Brown ........................ 236/12.11
3,561,483  2/1971  Tophin ....................... 236/12.11 X
3,980,229  9/1976  Stedman, Jr. et al. .......... 236/12.11
4,084,603  4/1978  Howard ....................... 137/88
4,109,678  4/1977  Lord ......................... 236/12.11

FOREIGN PATENT DOCUMENTS

720112  7/1931  France ....................... 236/12.11

Primary Examiner—William E. Tapolcai
Attorney, Agent, or Firm—Sughrue, Mion, Zinn, MacPeak & Seas

[57] ABSTRACT

A mixing valve apparatus is disclosed, for producing a mixed fluid of a desired temperature obtained by mixing high temperature fluid and low temperature fluid with each other. The apparatus includes a pressure-sensitive control unit (6) which operates in response to the differential pressure ($\Delta P$) between the inlet pressure of the low temperature fluid and the pressure of the mixed fluid, and which unit controls the opening degree of an inlet valve ($V_1$) for the high temperature fluid. Pilot passage ($R_0 \sim R_3$) for communicating the inlet pressure of the low temperature fluid to said unit is provided with a throttle (L, $L_1$) whose effective surface area varies in response to the temperature of the mixed fluid, to compensate the opening degree of the inlet valve ($V_1$) for the high temperature fluid upon variation of the temperature of the mixed fluid.

3 Claims, 9 Drawing Sheets

FIG_1

FIG_2

FIG_7

FIG_8

FIG.10

FIG_11

FIG_12

FIG_13

FIG_14

MIXING VALVE APPARATUS

TECHNICAL FIELD

The present invention relates to a mixing valve apparatus used to mix high temperature fluid, such as steam, hot water and the like, with low temperature fluid, such as cool water, in order to obtain mixed fluid of a desired temperature.

BACKGROUND ART

Generally, such a mixing valve apparatus includes a casing formed with a first inlet for the high temperature fluid, a second inlet for the low temperature fluid, a mixing chamber which is in communication with the first and second inlets, and in which the high temperature fluid and the low temperature fluid are mixed with each other, and an outlet which is in communication with the mixing chamber, with inlet valves for the high temperature fluid and the low temperature fluid arranged in association with the first and second inlets, respectively.

It is widely known that the mixing valve apparatus should have an automatic regulating function whereby the desired temperature of the mixed fluid is kept constant even upon the variation in the fluid supply pressure or in the consumption demand of the mixed fluid, and should moreover be safe in use. However, in known apparatuses, the regulating device for regulating the temperature of the mixed fluid is usually composed of deformable, temperature-sensitive elements such as bimetal elements arranged in association with the inlet valves for the high temperature fluid and low temperature fluid, respectively, and has a relatively simple characteristic whereby the temperature-sensitive elements control the opening degree of relevant inlet solely in response to the temperature of the mixed fluid, so that the device is not capable of performing the above mentioned desirable functions. Moreover, in particular situations where the supply of the low temperature fluid is interrupted by some reason, when the faucets at the mixed fluid discharge terminal are opened, in case of known mixing valve apparatus with the above-mentioned simple temperature regulating device, steam or the like high temperature fluid alone may be discharged from the faucets whereby it is difficult to sufficiently preserve the safety for users.

DISCLOSURE OF THE INVENTION

It is an object of the present invention to provide a mixing valve apparatus which, in comparison with the prior art, has an excellent automatic regulating function for regulating the temperature of the mixed fluid, and which is capable of preserving the user's safety.

To achieve the object, according to the present invention, there is provided a mixing valve apparatus including a casing formed with a first inlet for the high temperature fluid, a second inlet for the low temperature fluid, a mixing chamber which is in communication with the first and second inlets, and in which the high temperature fluid and the low temperature fluid are mixed with each other, and an outlet which is in communication with the mixing chamber, wherein an inlet valve is arranged in association with the first inlet and has a valve element for regulating the flow rate of the high temperature fluid into the mixing chamber, a control means being provided to control the opening of the inlet valve, characterized in that said control means comprises: a differential pressure element arranged in association with the second inlet, for generating a differential pressure between the second inlet and the mixing chamber; a pressure-sensitive control unit including a pressure-sensitive element for displacing the valve element of the inlet valve in response to the differential pressure, first and second pressure chambers isolated from each other by the pressure-sensitive element, the first pressure chamber being in communication with the mixing chamber, while the second pressure chamber being in communication with the second inlet via a pilot passage; and a temperature-sensitive element displaceable in response to the temperature of the mixed fluid within the mixing chamber, the temperature sensitive element forming a throttle in the pilot passage in the form of a small clearance whose size decreases or increases as the temperature of the mixed fluid increases or decreases.

With the above-mentioned arrangement of the present invention, when the user opens the faucet to use the mixed fluid, the low temperature fluid left within the casing is discharged from the outlet while a fresh low temperature fluid is supplied from the inlet into the mixing chamber whereby a differential pressure is generated between the relevant inlet and the mixing chamber. At the same time, the low temperature fluid is introduced through the pilot passage into the pressure chamber on one side of the pressure-sensitive element. As the pressure chamber on the other side of the pressure-sensitive element is applied with the fluid pressure within the mixing chamber, the pressure-sensitive element opens the inlet valve for the high temperature fluid in response to the differential pressure. By this, the high temperature fluid is now introduced into the mixing chamber for the first time, is mixed with the low temperature fluid in the mixing chamber, and is discharged through the outlet in the casing and from the faucet as the mixed fluid with the desired temperature. More particularly, it is possible to effectively prevent the discharge of high temperature fluid alone even when the supply of the low temperature fluid has been interrupted, and thus to preserve a sufficient safety in use.

Furthermore, when the temperature of the mixed fluid exceeds a predetermined level, the temperature-sensitive element is displaced accordingly to decrease the size of the small clearance as the throttle, thereby to lower the fluid pressure which is applied to one side of the pressure-sensitive element through the pilot passage. By this, the pressure sensitive element decreases the opening degree of the inlet valve for the high temperature fluid to decrease the flow rate of the high temperature fluid into the mixing chamber, so that the temperature of the mixed fluid can be reduced to the predetermined level. Conversely, when the temperature of the mixed fluid decreases below the predetermined level, the temperature of the mixed fluid can be increased to the predetermined level in the substantially opposite operational mode. Such an automatic regulating function for the mixed fluid temperature, afforded by the mixing valve apparatus in accordance with the present invention, is performed in a satisfactory manner even upon variation in the fluid supply pressure or in the consumption demand of the mixed fluid.

BRIEF DESCRIPTION OF THE DRAWINGS

FIG. 1 is a sectional view taken along the line B—B in FIG. 7;

BEST MODE OF CARRYING OUT THE INVENTION

The present invention will now be explained in detail with reference to preferred embodiments shown in the drawings.

There is shown in FIGS. 1 through 6 a mixing valve apparatus in accordance with one embodiment of the present invention, which apparatus is used to mix high temperature liquid, such as steam, hot water or the like (referred to "steam" hereinafter), with low temperature liquid, such as room temperature water or the like (referred to "cool liquid" hereinafter) into mixed liquid of desired temperature. More particularly, the apparatus of the present embodiment comprises a casing 1 with a steam inlet 2 for the introduction of steam, a cool liquid inlet 3 for the introduction of cool liquid, a mixing chamber 4 in communication with these inlets, in which steam is mixed with cool liquid, and an outlet 5 in communication with the mixing chamber 4, from which the mixed liquid is discharged. Furthermore, a steam inlet valve $V_1$ is arranged in association with the steam inlet 2.

In the present embodiment, a differential pressure valve $V_2$ is arranged adjacent to the cool liquid inlet 3, and the cool liquid is supplied into the mixing chamber 4 via the differential pressure valve $V_2$. With such an arrangement of the differential pressure valve $V_2$, as the cool liquid flows into the mixing chamber 4, a differential pressure $\Delta P$ can be generated between the cool liquid inlet 3 and the mixing chamber 4. The differential pressure valve $V_2$, which is formed of a variable-type orifice valve in the illustrated embodiment, may also be formed of a fixed-type orifice valve.

In the present embodiment, furthermore, a pressure-sensitive control unit 6 for compulsorily opening the steam inlet valve $V_1$ in response to increase in the differential pressure $\Delta P$ is arranged within the casing 1. This unit 6 includes a pressure-sensitive element in the form of a diaphragm 7 which operates in response to the differential pressure $\Delta P$, and a pair of pressure chambers 8a, 8b isolated from each other by the diaphragm 7, of which one pressure chamber 8a is in communication with the mixing chamber 4, while the other pressure chamber 8b is in communication with the cool liquid inlet 3 via pilot passages ($Ri$ $R_1$ $R_3$).

Figure 1:
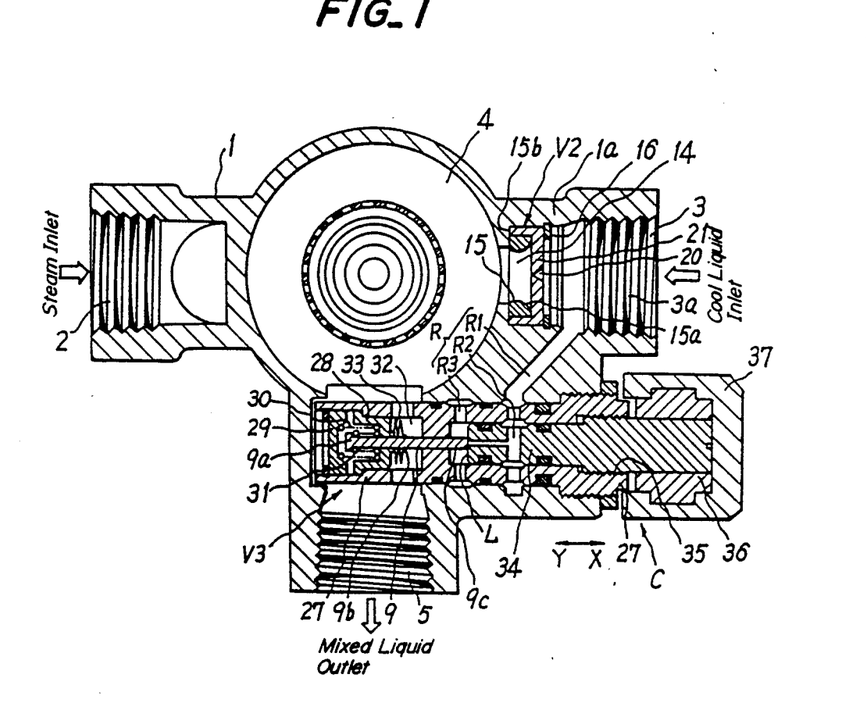
FIG. 1 is a cross-sectional view of one embodiment of the mixing valve apparatus in accordance with the present invention.
Figure 2:
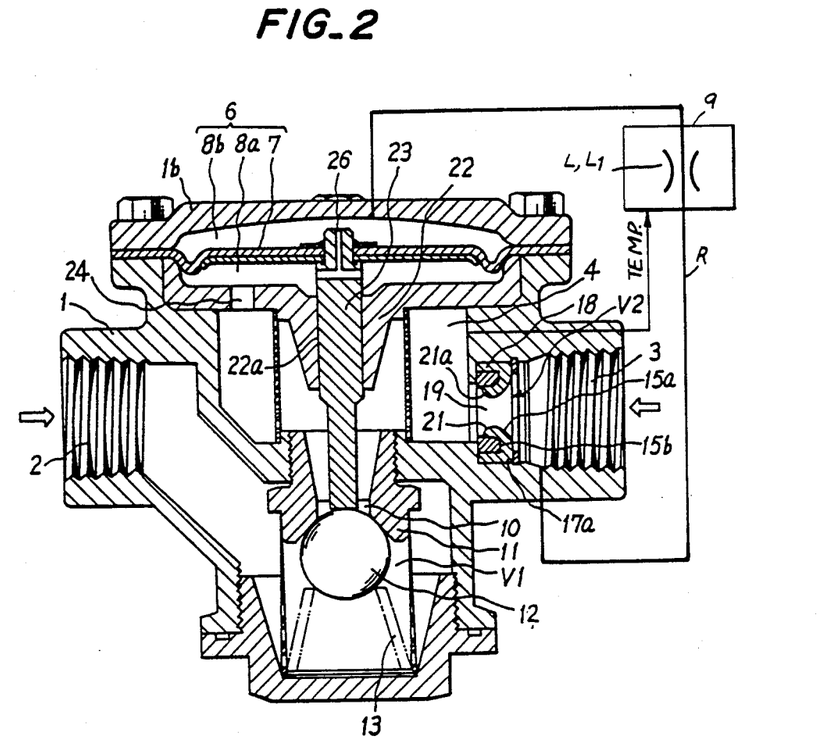
FIG. 2 is a longitudinal-sectional view thereof.

In the present embodiment, furthermore, an automatic temperature regulation valve $V_3$ is arranged within the casing 1 for controlling the opening degree of the steam inlet valve $V_1$ in accordance with the temperature of the mixed fluid. The regulation valve $V_3$ includes a temperature-sensitive pilot valve element 9 which operates in response to the temperature of the mixed fluid within the mixing chamber 4, and which forms a throttle in the form of a small clearance L in the pilot passage $R_2$. FIG. 2 shows the connection between pressure chamber 8b and inlet 3 via pilot passages R discussed above. For clarity's sake, pilot passages R are shown outside of casing 1; however, the pilot passages are actually formed in the casing 1. Associated with the pilot valve element 9, a temperature setting mechanism C is arranged with which the temperature of the mixed fluid can be manually adjusted by controlling the size of the clearance L. The pilot valve element 9, per se, is arranged such that its displacement in the direction of arrow X in FIG. 1 upon increase in the mixed fluid temperature results in decrease in size of the clearance L, while the displacement in the direction of arrow Y in FIG. 1 upon decrease in the mixed fluid temperature results in increase in size of the clearance L.

The details of the mixing valve apparatus with the above-mentioned basic structure will now be explained hereinafter.

The steam inlet valve $V_1$ includes a valve seat 11 with a valve opening 10 which communicates the steam inlet 2 and the mixing chamber 4 with each other, a ball valve element 12 arranged so as to be movable toward and away from the valve seat 11, and a spring 13 for biasing the ball valve element 12 toward the valve seat 11. The ball valve element 12 is adapted to move toward and away from the valve seat 11 in response to the displacement of the diaphragm 7 in the pressure-sensitive control unit 6.

Figure 3:
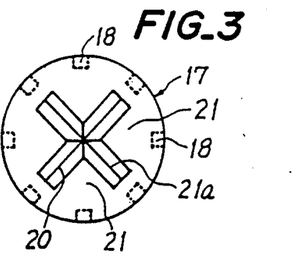
FIG. 3 is a front view of the orifice valve plate in the apparatus of FIG. 1.
Figure 4:
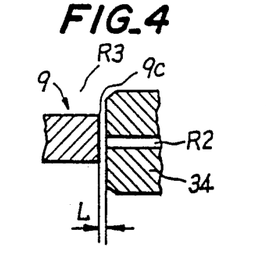
FIG. 4 is an enlarged sectional view of the small clearance which is formed in the pilot passage by the temperature-sensitive element in the apparatus of FIG. 1.
Figure 5:
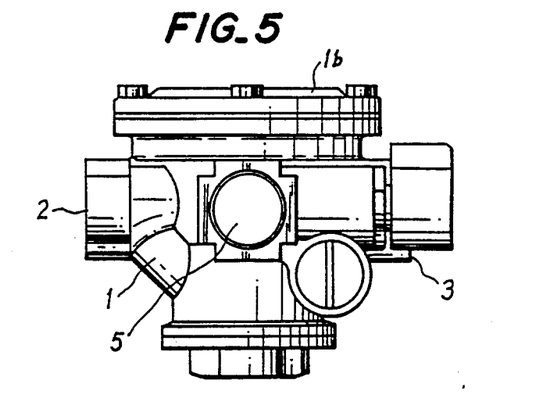
FIG. 5 is a front view showing the apparatus of FIG. 1 as a whole.

The orifice valve $V_2$ has a valve opening 14 formed in the cool liquid inlet portion 1a in the casing 1, which valve opening is defined by a valve seat 15 with its peripheral wall formed as a seat surface of an arcuate configuration. A snap ring 16 is arranged to locate a disc-like valve plate 17 with respect to the valve seat 15 along the outer periphery 17a thereof. In order to integrally secure the valve seat 15 and the valve plate 17, as shown in FIGS. 2 and 3, the outer periphery of the valve seat 15 is formed with recesses 15b, while projections 18 engageable with these recesses are provided on the outer periphery of the valve plate 17. The valve plate 17 is formed with X-shaped slits 20 for defining an orifice 19. These slits 20 circumscribe a plurality of resilient lugs 21 with respective edges 21a, which lugs are movable in response to the differential pressure $\Delta P$ across the upstream and downstream sides of the orifice valve $V_2$, between the closed position shown in FIG. 1 and the open position shown in FIG. 2.

The pressure-sensitive control unit 6 includes, in addition to the above mentioned diaphragm 7 and the pressure chambers 8a, 8b, a guide disc 22 fixedly arranged within the casing 1, and a stem 23 which is axially slidably guided within a center bore 22a of the guide disc 22. The stem 23 has a top end portion secured to the center portion of the diaphragm 7, and a bottom end portion which is in abutting engagement with the ball valve element 12. The pressure chamber 8a is defined between the guide disc 22 and one side of the diaphragm 7, and is in communication with the mixing chamber 4 via a bore 24 formed in the guide disc 22. Further, the pressure chamber 8b is defined between the other side of the diaphragm 7 and the top cover 1b of the casing 1, and is in communication with the pressure chamber 8a via a small bore 26 formed in the top end portion of the stem 23.

The automatic temperature control valve $V_3$ comprises a cylindrical case 27 mounted within the casing 1, in which the temperature-sensitive valve element 9 is slidably arranged. A movable spring seat 28 is slidably arranged within the case 27, and has a center bore for guiding the sliding movement of the valve element 9. A stationary spring seat 29 is secured within the case 27 in opposition to one end surface of the movable spring seat 28, and a compression spring 30 is arranged between both spring seats. Furthermore, a valve spring 31 is arranged between the movable spring seat 28 and an enlarged end 9a of the valve element 9. On the other hand, a temperature-sensitive element in the form of a bimetal 33 is arranged between that side of the movable spring seat 28 which is remote from the compression coil spring 30, and a snap ring 9b mounted on the valve element 9, and positioned within a fluid passage extending from the mixing chamber 4 and the outlet 5. The compression coil spring 30 allows the displacement of the movable spring seat 28 relative to the case 27, upon an excessive expansion deformation of the bimetal 33, and has such a spring force as to overcome the thrust to which the valve element 9 is subjected as a result of the differential pressure $\Delta P$. Furthermore, the valve spring 31 enables the necessary displacement of the valve element 9 even under a small differential pressure $\Delta P$, and may be dispensed with when a sufficient differential pressure is available. The valve element 9 has another end surface 9c which is arranged within a portion $R_3$ of the pilot passage in opposition to the end surface of an adjusting rod 34, such that the above-mentioned small clearance L is formed between these end surfaces. The said portion $R_3$ extends up to the pressure chamber 8b of the pressure sensitive control unit.

The adjusting rod 34 in the temperature setting mechanism C is formed therein with a portion $R_2$ of the pilot passage, which portion $R_2$ communicates with the remaining portions $R_1$, $R_3$ of the pilot passage. The adjusting rod 34 is coupled to the case 27 with a threaded portion 35 and has, on the side remote from the temperature-sensitive pilot valve element 9, one end 36 to which a manual adjusting knob 37 is fixedly secured. The rotation of the adjusting knob 37 about the center axis of the rod 34 results in the axial displacement of the rod in the direction of arrow X or Y in FIG. 1, to increase or decrease the size of the small clearance L.

Operation of the mixing valve apparatus in accordance with the above-mentioned embodiment is as follows. First of all, the desired temperature of the mixed fluid is set by rotating the manual adjusting knob 37 to axially displace the adjusting rod 34 in the direction of arrow X or Y. In such a situation, as the faucet (not shown) at the mixed liquid supply terminal is opened, the low temperature mixed fluid remaining within the casing 1 is discharged from the outlet 5 accompanying the decrease in the liquid pressure within the mixing chamber 4. This means that a differential pressure $\Delta P$ is formed between the cool liquid inlet 3 and the mixing chamber 4, and results in the resilient deformation of the lugs 21 of the orifice valve $V_2$ to open the orifice 19 so that the cool liquid from the inlet 3 is introduced into the mixing chamber 4 through the orifice 19. At the same time, a portion of the cool liquid from the inlet 3 is introduced into the pressure chamber 8b as the pilot fluid, through the pilot passage $R_1 \sim R_3$ and the small clearance L. Because the pressure chamber 8a on the opposite side of the diaphragm 7 is applied with the liquid pressure within the mixing chamber 4, through the bore 24, the diaphragm 7 urges the stem 23 downwardly, in response to the differential pressure $\Delta P$ between the cool liquid inlet 3 and the mixing chamber 4, to disengage the ball valve element 12 of the steam inlet valve $V_1$ away from the valve seat 11 against the force of the spring 13 and to thereby open the valve bore 10. By this, for the first time, steam from the inlet is introduced into the mixing chamber 4 via the valve $V_1$, is mixed in the chamber 4 with the cool liquid, and is discharged through the outlet 5 from the faucet as the mixed liquid of desired temperature. In other words, unless cool liquid is introduced into the mixing chamber 4 at first, initial flow of the steam alone into the mixing chamber 4 is prohibited, and thus the low temperature mixed fluid and cool liquid are initially discharged from the faucet to remarkably improve the safety in use. The pilot fluid which has been introduced into the pressure chamber 8b flows through the small bore 26, pressure chamber 8a and bore 24, into the mixing chamber 4.

Figure 6:
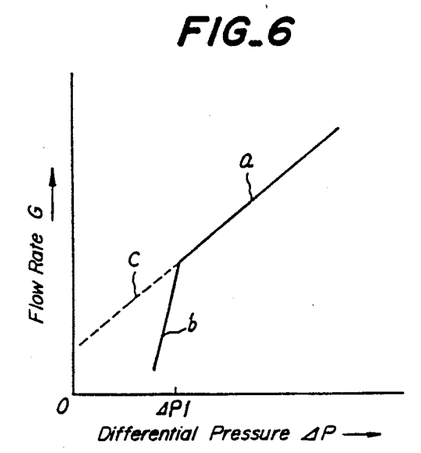
FIG. 6 is a graph showing the relationship between the flow rate and the differential pressure in the orifice valve of the apparatus of FIG. 1.

FIG. 6 is a graph showing the relationship between the flow rate and the differential pressure $\Delta P$ in the orifice valve $V_2$. With an increase in the flow rate (or the inlet pressure) of the cool liquid across the orifice valve $V_2$, the resilient lugs 21 of the valve plate 17, which have been closed as shown in FIG. 1, begin to gradually deflect proportionally with the differential pressure $\Delta P$ between the upstream and downstream sides of the valve plate, as shown in FIG. 2, accompanying an increase in the effective sectional area of the orifice 19 and a resultant increase in the flow rate G of the cool liquid which flows through the orifice 19. In the fully opened state of the orifice 19, the resilient lugs 21 are brought into tight contact with the seat surface 15a of the valve seat 15 and the differential pressure increases to $\Delta P_1$ or more, with the relationship between the differential pressure $\Delta P$ and the flow rate G being represented by a relatively less steep straight line a in a logarithmic scale. In the semi-opened state of the orifice 19, the resilient lugs 21 assume a deflected position in which their resilient restoring force is in equilibrium with the differential pressure $\Delta P$, with the relationship between the differential pressure $\Delta P$ and the flow rate G being represented by relatively steep straight line b. The straight line c represents the relationship between the differential pressure $\Delta P$ and the flow rate G with an assumption that the resilient lugs 21 are fully opened or the orifice 19 is a fixed orifice. Comparison of the straight lines b and c with each other, makes it readily apparent that the orifice valve in the present embodiment provides a sufficient differential pressure ΔP even in its semi-opened state and with a small flow rate G. It is thus possible to actuate the diaphragm 7 forming the pressure-sensitive element which operates in response to the differential pressure ΔP, with a high sensitivity and in a stable and positive manner.

With decreased flow rate (or pressure) of the cool liquid from the inlet 3, which is introduced into the mixing chamber 4 through the orifice 19, there takes place a restoring deformation of the resilient lugs 21 into semi-opened state when, as mentioned with respect to the straight line b in FIG. 6, the diaphragm 7 can be actuated in response to the decrease in the flow rate G with a sufficient sensitivity, so that it is possible to properly decrease the opening degree of the steam inlet valve $V_1$ to maintain the predetermined temperature of the mixed liquid.

Furthermore, as the mixed liquid temperature increases in excess of the predetermined level, the bimetal 33 forming the temperature-sensitive element undergoes an expansion deformation to displace the temperature-sensitive pilot valve element 9 in the direction of arrow X in FIG. 1, against the force of the spring 31, so as to reduce the size of the small clearance L in the pilot passage. As a result, the flow rate of the pilot fluid introduced into the pressure chamber 8b decreases whereby the diaphragm 7 and the stem 23 are moved upwardly to decrease the opening degree of the steam inlet valve $V_1$ and hence, the flow rate of the steam into the mixing chamber 4, making it possible to maintain the temperature of the mixed liquid at a predetermined level.

With the introduction into the mixing chamber 4 of the cool liquid at a decreased flow rate/pressure, or when the temperature of the mixed liquid does not reach a predetermined level, it is of course that an automatic regulating function is achieved essentially in an opposite sense, in contrast with the above-mentioned description, to control the temperature of the mixed fluid.

FIGS. 7 through 12 show the mixing valve apparatus in accordance with another embodiment of the present invention, in which reference characters or numerals used in connection with previous embodiment denote functionally equivalent elements. The apparatus of the present embodiment has a structure the majority of which are the same as those of previous embodiment, so that the following description is mainly directed to the differences.

Figure 7:
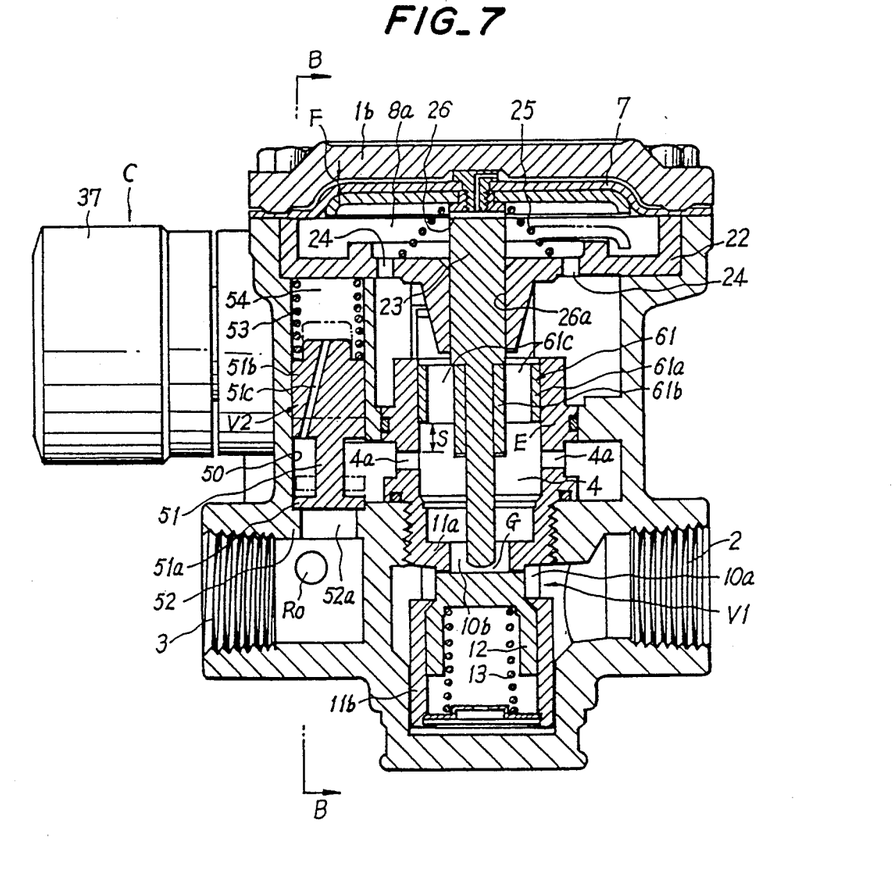
FIG. 7 is a longitudinal-sectional view of another embodiment of the mixing valve apparatus in accordance with the present invention, with the steam inlet valve closed.
Figure 8:
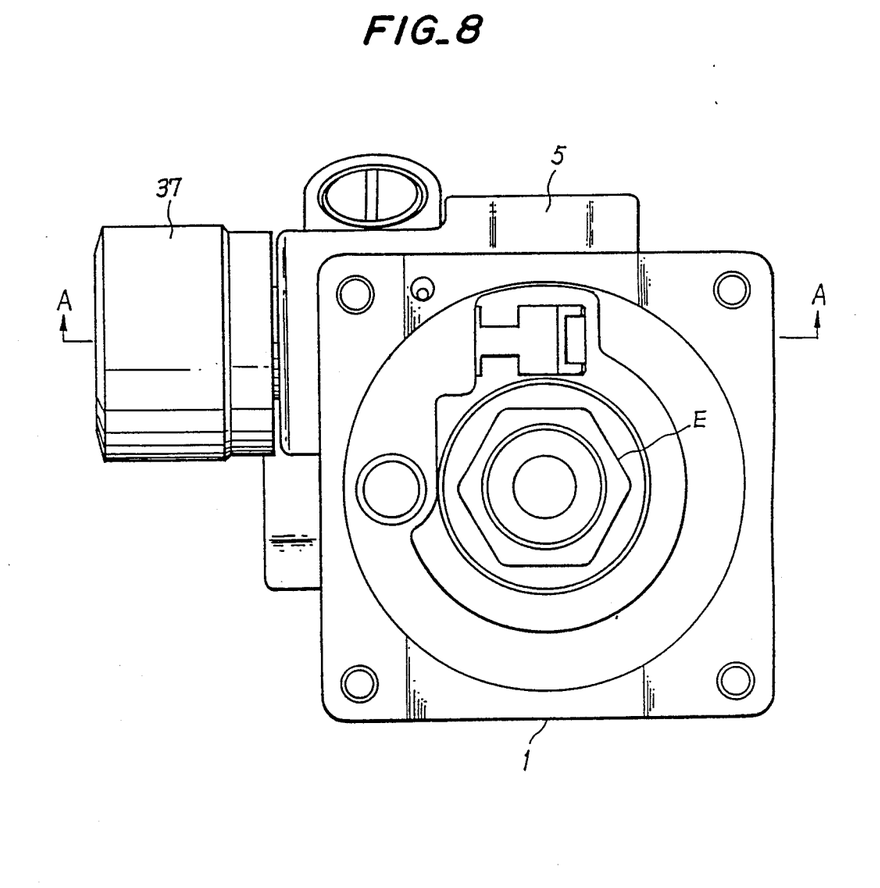
FIG. 8 is a plan view thereof, with the upper cover and diaphragm removed.

In the present embodiment, as shown in FIG. 7, as means for generating the differential pressure ΔP between the cool liquid inlet 3 and the mixing chamber 4, a fixed orifice bore 4a is arranged on the peripheral wall of the mixing chamber 4 in addition to the differential pressure valve $V_2$. The differential pressure valve $V_2$, per se, includes a guide bore 50, a valve element 51 in the form of a plunger slidably arranged in the guide bore, a valve seat 52 with an inlet bore 52a for the cool liquid, on which rests the head 51a of the valve element 51, and a spring 53 for biasing the valve element 51 toward the valve seat 52. The valve element 51 has a barrel 51b in which is formed a pressure balancing bore 51c for communicating the space behind the head 51a with a chamber 54 for housing the spring 53.

The differential pressure generating means with such a structure effectively serves to subject the diaphragm 7 as the pressure-sensitive element to a sufficient differential pressure even upon a small consumption demand of the mixed liquid. In order words, in case of a substantial consumption demand of the mixed liquid, the cool liquid inlet pressure is at a high level so that the valve element 51 is urged upwardly away from the valve seat 52 and does not significantly contribute to generate the differential pressure which is thus generated solely by the fixed orifice bore 4a. On the contrary, with a decreased consumption demand of the mixed liquid, the valve element 51 moves to a position which is close to the valve seat 52 and comes to generate the differential pressure, compensating for an insufficient differential pressure which has been generated by the fixed orifice bore 4a alone.

Figure 10:
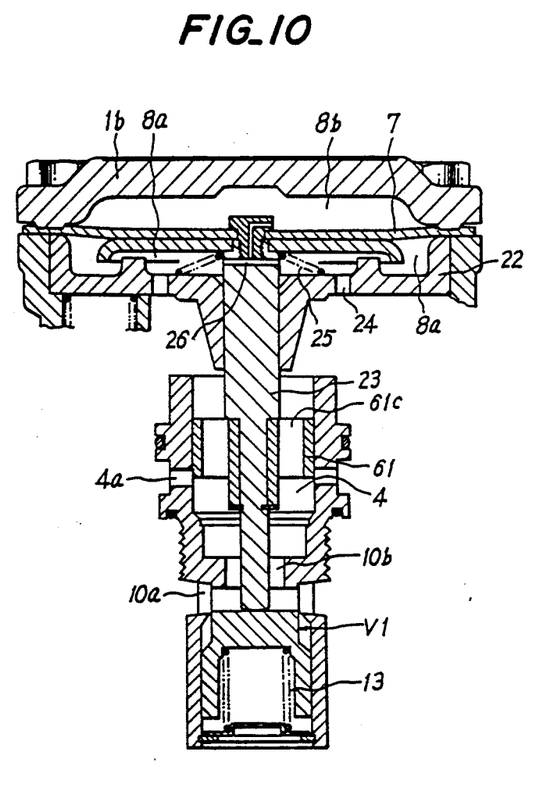
FIG. 10 is a partial longitudinal-sectional view showing the stem inlet valve in its open position.

Furthermore, as shown in FIGS. 7 and 10, the stem 23 is connected to the diaphragm 7 as the pressure-sensitive element and operates in response to the differential pressure ΔP. This stem 23 is provided with a throttle valve for gradually restricting the opening area of the cool liquid bore 4a of the mixing chamber 4 when the stem 23 has moved a predetermined amount S in the direction to open the steam inlet valve $V_2$. This throttle valve includes a double cylindrical valve body 61 with an outer cylinder 61a of the valve body 61 being movable along the inner wall of the mixing chamber 4 to close the cool liquid bore 4a, and an inner cylinder 61b in the form of a boss which is connected to the stem 23, defining an axially extending space 61c between the two cylinders to form part of the mixing chamber 4.

Generally, the flow rate of the mixed liquid in the mixing valve apparatus is determined by users as the opening degree of the faucet. When the flow rate is increased under the situation where the temperature of the mixed liquid has been set to high level, even with the fully opened state of the steam inlet valve, the heat quantity may become insufficient and the desired temperature may not be achieved. However, the provision of the throttle valve 61 as mentioned above makes it possible to increase the flow rate of the cool liquid until the steam inlet valve is fully opened, and to gradually decrease the flow rate of the cool liquid after the steam inlet valve has been fully opened, to thereby discharge the mixed liquid of a desired temperature.

In the present embodiment, furthermore, also as shown in FIGS. 7 and 10, the diaphragm 7 is biased such as to minimize, in the unpressurized condition thereof, the volume of the pressure chamber 8b communicating with the cool liquid inlet 3 via the pilot passage $R_1 \sim R_3$ and hence, the distance F between the top cover 1b and the pressure receiving surface of the diaphragm 7. Advantageously, this distance F is e.g. approximately 0.5 mm. Such a biasing means may be one which uses the resiliency of the diaphragm, per se. Preferably, as the biasing means, a conical compression coil spring 25 may be arranged within the pressure chamber 8a communicating with the mixing chamber 4. In any case, the biasing force should be sufficient enough to overcome the dead weight of the diaphragm 7, stem 23 and throttle valve 61. Moreover, the arrangement should be such that a predetermined gap G is left between the bottom end of the stem 23 in its unloaded state, and the valve element 12 of the steam inlet valve $V_1$ in the closed position thereof.

When the faucet on the downstream side is closed, the pressure chambers 8a and 8b on upper and lower sides of the diaphragm 7 are prevailed by the same pressure. When, furthermore, air remains in the pressure chamber 8a, this air is compressed according to the pressure of the cool liquid. The pressure in these chambers drops instantaneously as the user opens the faucet once again, accompanying an expansion of the compressed air. As a result, the diaphragm 7 may be urged downwardly by the expanding air before the pressure chamber 8b is properly subjected to the cool liquid pressure. This may invite a malfunction of the steam inlet valve $V_1$ or a premature opening thereof, with the risk in the worst case of sudden discharge of the steam out of the faucet.

When, however, the volume of the pressure chamber 8b in the unpressurized condition is minimized as mentioned above, the influence of the air expansion in this chamber is substantially negligible. Furthermore, even when the diaphragm 7 is urged downwardly by the expanding air, the initial displacement can be absorbed by the gap G between the bottom end of the stem 23 and the valve element 12. Accordingly, it is possible to substantially completely prevent undesirable malfunction of the steam inlet valve arising from the expansion of the air within the pressure chamber.

Figure 9:
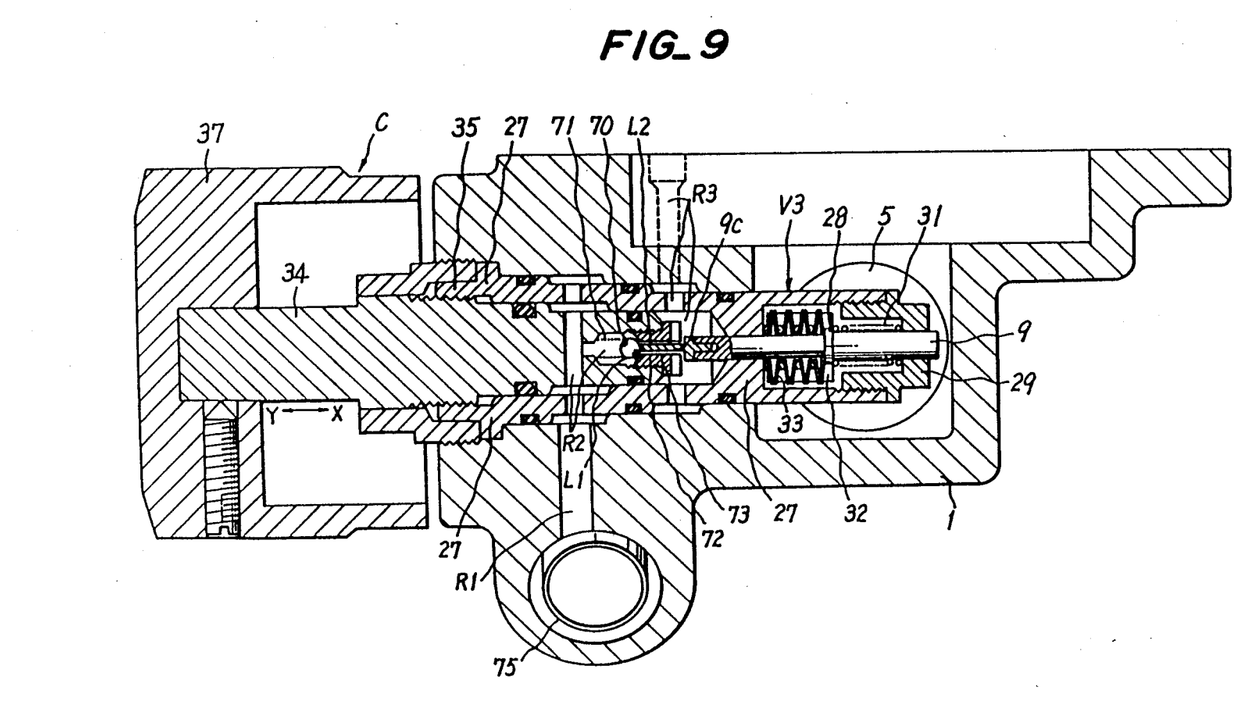
FIG. 9 is a longitudinal sectional view showing the detailed structure of the temperature-sensitive element and temperature setting mechanism.
Figure 11:
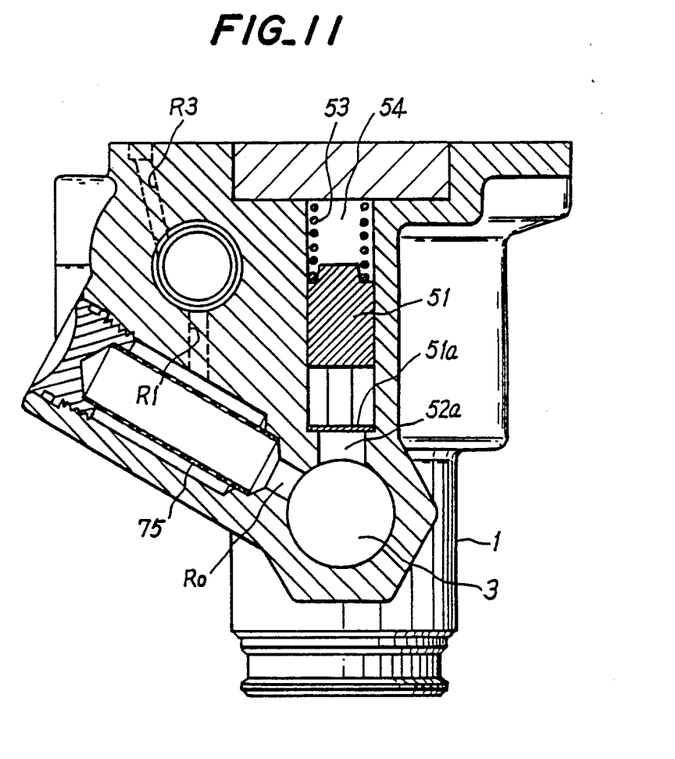
Figure 12:
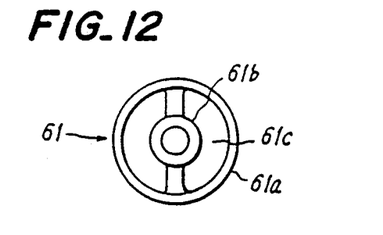
FIG. 12 is a plan view of the cool liquid throttle valve shown in FIG. 7.

In the present embodiment, furthermore, as shown in FIG. 9, there is provided a pilot valve element 70 arranged within the pilot passage $R_1 \sim R_3$, apart from the pressure-sensitive element 9 of the automatic temperature regulating valve $V_3$, which valve element 70 is formed of a ball valve element urged by a spring 71 toward the valve seat 72. The valve seat 72 has a bore 73 in which is arranged the end 9c of the pressure-sensitive element 9 such that clearance $L_2$ is formed between the inner periphery of the valve seat bore 73 and the outer periphery of the end 9c of the pressure-sensitive element. On the other hand, a small clearance $L_1$ is formed between the pilot valve element 70, its valve seat 72 and the end 9c of the pressure sensitive element, whose size is varied automatically according to the mixed liquid temperature and the cool liquid pressure. In other words, the above-mentioned elements are so arranged that the size of the small clearance $L_1$ is decreased or increased in response to increase or decrease of the mixed liquid temperature or the cool liquid pressure. preferably, as shown in FIGS. 9 and 11, a strainer 75 is arranged between the pilot passages $R_0$ and $R_1$.

Generally, the cool liquid consists of water provided by supply service, so that the water pressure may significantly fluctuate according to the daily schedule of hours. On the other hand, the mixed liquid obtained by the mixing valve apparatus, i.e. hot water is often used in a toilet room or bath room so that even a slight fluctuation of the temperature is felt by the user as a substantial change, and may sometimes invite a scald.

Figure 13:
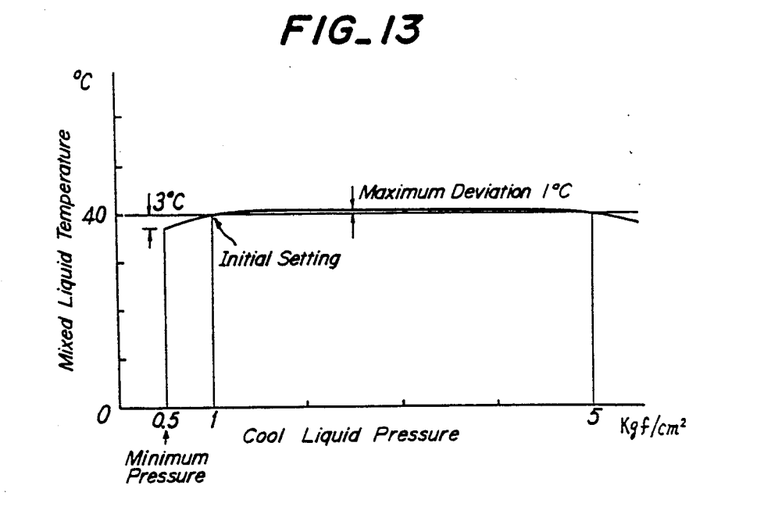
FIG. 13 is a graph showing the relationship between the cool liquid pressure and the mixed liquid temperature in the apparatus of FIG. 7.
Figure 14:
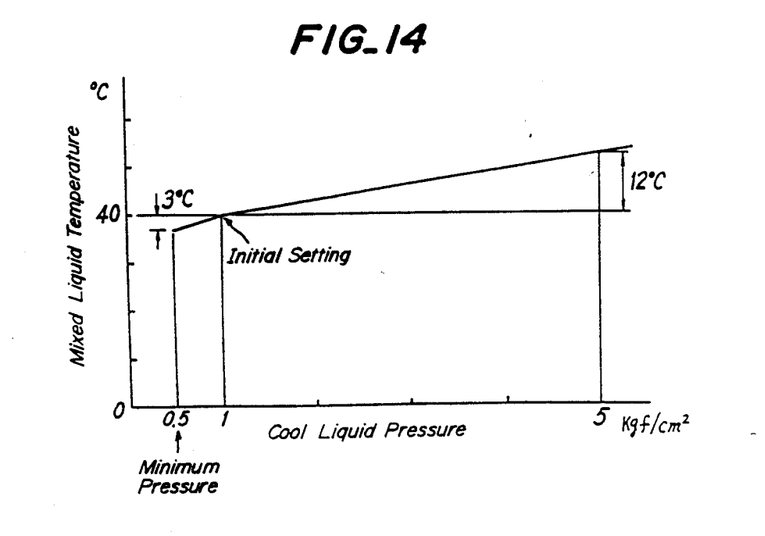
FIG. 14 is a graph showing the relationship between the cool liquid pressure and the mixed liquid temperature in a comparative apparatus.

According to the arrangement of the present embodiment, as will be readily appreciated from the foregoing description, the size of the small clearance within the pilot passage decreases upon increase in the cool liquid pressure. Although the size of the small clearance decreases upon increase in the cool liquid pressure, this increased pressure results in increase in the differential pressure $\Delta P$ so that the supply flow rate does not decrease. More particularly, the pressure in the pilot passage is kept substantially unchanged from the initially determined level, and the pilot valve $V_2$ may be actuated as one kind of a constant flow rate valve, making it possible to effectively maintain constant the mixed liquid temperature despite the fluctuation of the cool liquid pressure. Such a desirable temperature regulating function is clearly seen in the graphs of FIGS. 13 and 14. These graphs show the relationship between the cool liquid temperature and the mixed liquid temperature, with the predetermined temperature of the mixed liquid of 40° C., and the initial steam pressure and cool liquid pressure both being 1 kgf/cmz. The data shown in FIG. 13 has been obtained by the embodiment of the present invention, while FIG. 14 shows the data obtained by a comparative arrangement in which the size of the small clearance increases upon increase in the cool liquid pressure. It is evident that the comparative arrangement accompanies a substantial fluctuation in the temperature of the mixed liquid as a result of fluctuation of the cool liquid pressure, whereas the apparatus of the present embodiment effectively maintains constant the mixed liquid temperature.

It will be readily appreciated from the foregoing description, that the present invention provides a mixing valve apparatus which, in comparison with the prior art, has an excellent automatic regulating function for regulating the temperature of the mixed fluid, and which is capable of preserving the user's safety. It is of course that the present invention is not limited to the illustrated arrangements which were given by way of examples only, and may be carried out with various modes without departing from the scope of the invention.

We claim:

1. A mixing valve apparatus including a casing (1) formed with a first inlet (2) for high temperature fluid, a second inlet (3) for low temperature fluid, a mixing chamber (4) which is in communication with the first and second inlets (2,3), and in which the high temperature fluid and the low temperature fluid are mixed with each other, and an outlet (5) which is in communication with the mixing chamber (4), wherein an inlet valve ($V_1$) is arranged to be associated with the first inlet (2) and has a valve element (12) for regulating the flow rate of the high temperature fluid into the mixing chamber (4), control means being provided to control the opening of the inlet value ($V_1$), said control means comprising:

a differential pressure element ($V_2$, 4a61) associated with the second inlet (3), for generating a differential pressure (P) between the second inlet (3) and the mixing chamber (4);

a pressure-sensitive control unit (6) including a pressure-sensitive element (7) for displacing the valve element (12) of the inlet valve ($V_1$) in response to the differential pressure (P), first and second pressure chambers (8a, 8b) isolated from each other by the pressure-sensitive element (7), the first pressure chamber (8a) being in communication with the mixing chamber (4), while the second pressure chamber (8b) being in communication with the second inlet (3) via pilot passage ($R_0$, $R_3$); and a temperature-sensitive element (9) displaceable in response to the temperature of the mixed fluid within the mixing chamber (4), the temperature-sensitive element (9) forming a throttle in the pilot passage ($R_0R_3$) in the form of a small clearance ($L'L_1$) whose size decreases or increases as the temperature of the mixed fluid increases or decreases wherein said temperature-sensitive element (9) is displaceable in a first direction upon an increase in the fluid pressure within the pilot passages ($R_0R_3$) so that the size of said small clearance ($L'L_1$) decreases, and is displaceable in a second direction upon a decrease in the fluid pressure within the pilot passage so that the size of the small clearance increases.

2. The mixing valve apparatus as claimed in claim 1, wherein said pressure-sensitive element (7, 23) and said valve element (12) of said inlet valve ($V_1$) are arranged with respect to each other such that a gap (G) is formed therebetween in the closed position of said valve element (12).

3. A mixing valve apparatus including a casing (1) formed with a first inlet (2) for high temperature fluid, a second inlet (3) for low temperature fluid, a mixing chamber (4) which is in communication with the first and second inlets (2, 3), and in which the high temperature fluid and the low temperature fluid are mixed with each other, and an outlet (5) which is in communication with the mixing chamber (4), wherein an inlet valve ($V_1$) is arranged associated with the first inlet (2) and has a valve element (12) for regulating the flow rate of the high temperature fluid into the mixing chamber (4), control means being provided to control the opening of the inlet value ($V_1$), said control means comprising:

a differential pressure element ($V_2$, 4a, 61) associated with the second inlet (3), for generating a differential pressure (P) between the second inlet (3) and the mixing chamber (4);

a pressure-sensitive control unit (6) including a pressure-sensitive element (7) for displacing the valve element (12) of the inlet valve ($V_1$) in response to the differential pressure (P), first and second pressure chambers (8a, 8b) isolated from each other by the pressure-sensitive element (7), the first pressure chamber (8a) being in communication with the mixing chamber (4), while the second pressure chamber (8b) being in communication with the second inlet (3) via pilot passage ($R_0$, $R_3$);

a temperature-sensitive element (9) displaceable in response to the temperature of the mixed fluid within the mixing chamber (4), the temperature-sensitive element (9) forming a throttle in the pilot passage ($R_0$ $R_3$) in the form of a small clearance ($L'L_1$) whose size decreases or increases as the temperature of the mixed fluid increases of decreases wherein said temperature-sensitive element (9) is displaceable in a first direction upon an increase in the fluid pressure within the pilot passages ($R_0$ $R_3$) so that the size of said small clearance ($L'L_1$) decreases, and is displaceable in a second direction upon a decreases in the fluid pressure within the pilot passage so that the size of the small clearance increases; and the mixing valve apparatus, said pressure-sensitive element (7, 23) and said valve element (12) of said inlet valve (V1) being arranged with respect to each other such that a gap (G) is formed therebetween in the closed position of said valve element (12).

* * * * *